UNITED STATES PATENT OFFICE.

WILHELM DRECHSLER, OF DRESDEN, GERMANY.

PROCESS FOR PURIFYING WATER.

1,088,063. Specification of Letters Patent. Patented Feb. 24, 1914.

No Drawing. Application filed November 21, 1912. Serial No. 732,682.

*To all whom it may concern:*

Be it known that I, WILHELM DRECHSLER, a subject of the Emperor of Germany, residing at Dresden, Germany, have invented a certain Process for Purifying Water, of which the following is a specification.

Water is generally cleared of organic and mineral substances by a chemical admixture adapted to oxidize such substances, the oxygen of the air being unsuitable for the purpose. According to one of the processes adopted for the purpose, the water is mixed with an aluminium salt and soda and then, after the suspended particles have been allowed to precipitate, treated with salt of iron or permanganate of potassium.

The present invention relates to a similar process, and its object is to enable large quantities of water to be quickly and effectively purified at a small expenditure. With this object in view the water is first mixed with small quantities of sulfate of iron or aluminium for the purpose of binding the substances suspended in the water and prevent them, during the subsequent oxidation process, from attracting the oxygen for their own oxidation. After the water has been treated with these chemicals it is, without waiting for the suspended particles to precipitate, mixed in unfiltered condition with a thin watery solution of manganate or permanganate of potassium, 5–10 grams of these substances being sufficient for one cubic meter of water. While the mixing takes place, an air jet is introduced into the water, in known manner, partly for the purpose of hastening the distribution of the oxidizing materials and partly for separating off, by converting them into manganic oxids, the manganic salts which may happen to dissolve. The suspended organic substances, after the ferric or aluminium salt has been added to the water, will be rendered practically proof against oxidation with permanganate. The air jet insures a rapid distribution and disintegration of the oxidized materials and prevents dissolving manganic salts from spoiling the water. The time occupied in the purification of the water is considerably shortened by the improved process, this being of great importance in water-works for towns and the like. A 2% solution of sulfate of aluminium being added to the water in the first instance, the following chemical reaction occurs:

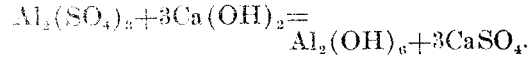

At the subsequent addition of permanganate solution, the reaction which occurs is as follows:

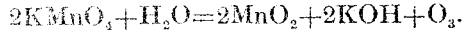

I claim:

A process of purifying water, consisting in mixing the water with a weak solution of aluminium sulfate and then adding to the unfiltered water, while an air-jet is being introduced into the same and without waiting for the suspended particles to precipitate, a thin watery solution of permanganate of potassium.

WILHELM DRECHSLER.

Witnesses:
PAUL ARRAS,
CLÄRE SIMON.